(12) United States Patent
Satyan et al.

(10) Patent No.: US 12,517,233 B2
(45) Date of Patent: Jan. 6, 2026

(54) PHOTONIC INTEGRATED CIRCUIT, LIGHT DETECTION AND RANGING SYSTEM, VEHICLE USING THE SAME, AND COMPUTER READABLE MEDIUM

(71) Applicant: Intel Corporation, Santa Clara, CA (US)

(72) Inventors: Naresh Satyan, Pasadena (CA); George Rakuljic, Santa Monica (CA); Yaakov Vilenchik, Jerusalem (IL); Israel Petronius, Haifa (IL); Ron Friedman, Givat Oz (IL)

(73) Assignee: Intel Corporation, Santa Clara, CA (US)

( * ) Notice: Subject to any disclaimer, the term of this patent is extended or adjusted under 35 U.S.C. 154(b) by 958 days.

(21) Appl. No.: 17/704,055

(22) Filed: Mar. 25, 2022

(65) Prior Publication Data

US 2022/0381889 A1    Dec. 1, 2022

Related U.S. Application Data

(63) Continuation of application No. PCT/US2021/034674, filed on May 28, 2021.

(51) Int. Cl.
| | |
|---|---|
| *G01S 7/4913* | (2020.01) |
| *G01S 7/481* | (2006.01) |
| *G01S 7/4915* | (2020.01) |
| *G01S 7/499* | (2006.01) |
| *G01S 17/32* | (2020.01) |
| *G01S 17/931* | (2020.01) |

(52) U.S. Cl.
CPC .......... *G01S 7/4913* (2013.01); *G01S 7/4818* (2013.01); *G01S 7/4915* (2013.01); *G01S 7/499* (2013.01); *G01S 17/32* (2013.01); *G01S 17/931* (2020.01)

(58) Field of Classification Search
CPC .... G01S 7/4913; G01S 7/4818; G01S 7/4915; G01S 7/499; G01S 17/32; G01S 17/931
See application file for complete search history.

(56) References Cited

U.S. PATENT DOCUMENTS

| | | |
|---|---|---|
| 2018/0156661 A1 | 6/2018 | Doylend et al. |
| 2018/0306925 A1 | 10/2018 | Hosseini et al. |
| 2019/0257927 A1* | 8/2019 | Yao ........................ G01S 7/4815 |
| 2020/0003879 A1 | 1/2020 | Amor et al. |
| 2020/0088848 A1* | 3/2020 | Kremer ................... G01S 17/66 |
| 2020/0191959 A1 | 6/2020 | Zheng et al. |

(Continued)

FOREIGN PATENT DOCUMENTS

WO    2020161250 A1    8/2020

OTHER PUBLICATIONS

Eurpean Search Report issued for the corresponding EP patent application No. EP21 943 266.3, dated Dec. 6, 2024, 10 pages (For informational purposes only).

(Continued)

*Primary Examiner* — Dominic J Bologna

(74) *Attorney, Agent, or Firm* — Viering, Jentschura & Partner mbB

(57) ABSTRACT

A light detection and ranging system is provided having an interlaced angular dispersion by providing a photonic integrated circuit having a plurality of light paths having a non-uniform next-neighbor distance and emitting light of different wavelengths through the light paths.

21 Claims, 7 Drawing Sheets

(56) References Cited

U.S. PATENT DOCUMENTS

| | | |
|---|---|---|
| 2021/0018598 A1 | 1/2021 | Rakuljic |
| 2021/0116703 A1* | 4/2021 | Pulikkaseril ............ G01S 17/89 |
| 2022/0283308 A1* | 9/2022 | Schrans ................. G02F 1/292 |
| 2022/0334227 A1* | 10/2022 | Davydenko ........... G01S 7/4817 |

OTHER PUBLICATIONS

International Search Report issued for the corresponding international patent applicaction No. PCT/US2021/034674, dated Feb. 28, 2022, 3 pages (for informational purposes only).

* cited by examiner

PHOTONIC INTEGRATED CIRCUIT, LIGHT DETECTION AND RANGING SYSTEM, VEHICLE USING THE SAME, AND COMPUTER READABLE MEDIUM

CROSS-REFERENCE TO RELATED APPLICATION

This non-provisional application is a domestic continuation bypass application of PCT/US2021/034674, filed on May 28, 2021, the entirety of which is fully incorporated herein by reference.

TECHNICAL FIELD

This disclosure generally relates to the field of light detection and ranging systems.

BACKGROUND

Coherent light detection and ranging (LIDAR) is desirable for autonomous vehicles due to its inherent immunity to optical interference and ability to detect both the range and range-rate (relative velocity of a target) to a target. Notwithstanding these attributes, a coherent LIDAR system must still provide a long range detection capability (>200 m) and a high data rate (>1M pixels/s) with high optical resolution (>100 vertical pixels) to be commercially viable.

Long-range LIDAR systems for self-driving and autonomous vehicles have a number of key metrics that need to be achieved simultaneously, e.g. high data rate, wide field of view (FOV), large channel count, and high angular resolution. The number of lines available to cover the field of view is limited by cost, size, reliability and other constraints. There is a need to utilize efficiently the limited number of available lines to both achieve high resolution in the parts of the FOV that are important to the customer, but also not compromise on the total FOV or have large gaps in the coverage of the FOV.

LIDAR systems typically use a single mechanical or other scanner to scan the entire two-dimensional field of view, or an array of parallel channels (lines) that are scanned in one dimension.

A Photonic Integrated Circuit (PIC) is desirable for coherent LIDAR due to the promise of low cost and scalability to high volume. However, due to PIC limitations (size, yield, cost), the number of vertical channels (resolution elements) is limited (~10's) and does not easily scale. Further, most of the targets of LIDAR do not reflect back the circular polarization state of the emitted light that can reduce the collected signal. Achieving a high resolution over a wide FOV often results in a prohibitively high number of channels. This is particularly true of photonic integrated circuit (PIC) implementations of LIDAR systems where the number of channels can be limited by PIC size, cost and reliability.

Usually, a bistatic coherent LIDAR with separate transmitter/receiver (Tx/Rx) PICs is provided. In the bistatic coherent LIDAR, a quarter wave plate (QWP) may be used to produce a circular polarization on the target as solution to differentiate between received (RX) signals and transmitted (Tx) signals.

Alternatively, a monostatic coherent LIDAR with a single transmitter/receiver (Tx/Rx) PIC is provided.

Further, solutions based on separate Rx or Tx optics and/or optical paths, where the Rx stares at the target with different viewing-angle, offset, focus, or field of view (FOV) compared to the I/O beam are provided.

A common problem to all of these approaches is the ability to achieve the required spatial resolution and wide field of view with a limited number of parallel channels.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, the invention is described with reference to the following drawings, in which.

DESCRIPTION

Figure 1:
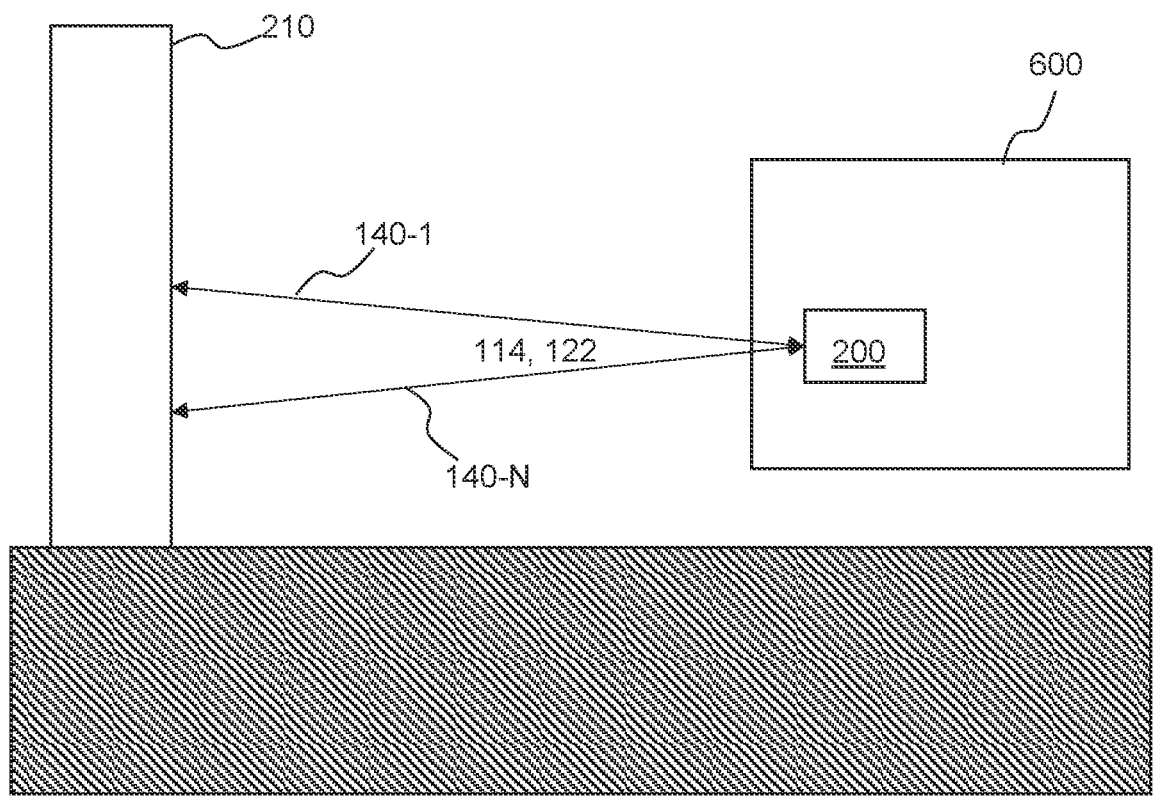
FIG. 1 illustrates a schematic illustration of a vehicle having a light detection and ranging system.

The following detailed description refers to the accompanying drawings that show, by way of illustration, specific details in which the invention may be practiced.

The term "as an example" is used herein to mean "serving as an example, instance, or illustration". Any aspect or design described herein as "as an example" is not necessarily to be construed as preferred or advantageous over other aspects or designs.

Light detection and ranging (LIDAR) systems for self-driving and autonomous vehicles are required to have a wide field of view (FOV) and high resolution in order to detect road hazards at long ranges. A common and efficient way to achieve this coverage is to have a number of parallel channels in one dimension, e.g. the vertical angles that are scanned in the second dimension, e.g. the horizontal angles). Here, a LIDAR system is provided that provides the required coverage in a first (e.g. vertical) dimension using parallel channels in a cost-effective, scalable and reliable manner. Tailoring the resolution over the field of view overcomes the usual limitations. Tailoring the resolution distributes a limited number of channels in such a way as to achieve high angular resolution in a "fine" region where it is critical (e.g., the angular FOV that looks at the road surface at long range), and use a lower angular resolution in the "coarse" region in the rest of the FOV (e.g., above the horizon, or looking down at the road at shorter ranges). The result of the tailored resolution is the interlaced angular dispersion of the LIDAR system. Illustratively, in the interlaced angular dispersion of the LIDAR system, light of a second wavelength emitted through a first light path has an angular dispersion between the angular dispersion of light of a first wavelength emitted through the same light path and an adjacent light path. Thus, the interlaced angular dispersion of the LIDAR system can be achieved by a specific PIC layout and a specific control of light sources of the LIDAR system.

Illustratively, a wavelength-interlaced multi-channel LIDAR system is provided that simultaneously achieves a high angular resolution and wide field of view (FOV) by tailoring the line spacing in the angular dispersion of the LIDAR system. Two sets of angular dispersions (also denoted as lines in the FOV) may be interlaced (see FIG. 6) to achieve this. Multiple, generally non-uniform, spatially separated channels such as the location of the outputs of light paths having waveguides on a LIDAR photonic integrated circuit (PIC), determine a first set of lines (see FIG. 4). Wavelength diversity and a dispersive element (grating) (see FIG. 5) provide a second set of lines. This way, a LIDAR system with high resolution in the most important parts of the field of view, e.g. in the center of the FOV, without overly degrading performance in the other parts of the field of view, e.g. the edges of the FOV, is provided (see FIG. 7). This can be achieved without increasing the cost, size and power consumption of the LIDAR system beyond customer expectations, or adversely impacting system reliability.

In this specification, the angular spacing of lines in the FOV is denoted as angular dispersion of the LIDAR system. Spatial locations of the outputs of the light paths of the PIC and an optical element such as a lens and/or a grating may determine the angular dispersion of the LIDAR system. The optical element converts the spatial locations of the outputs of the light paths to angles. Thus, the angular spacing of spectral lines can be visually inferred.

The interlaced angular dispersion may be applied to any type of parallel channel LIDAR system configurations, e.g. time of flight (TOF) LIDAR and coherent LIDAR, and the monostatic LIDAR, through the mirror LIDAR, and bistatic LIDAR.

FIG. 1 illustrates a schematic diagram of a vehicle 600 having a LIDAR system 200 integrated therein, as an example. The vehicle 600 may be an unmanned vehicle, e.g. unmanned aerial vehicle or unmanned automobile. The vehicle 600 may be an autonomous vehicle. Here, the LIDAR system 200 may be used to control the direction of travel of the vehicle 600. The LIDAR system 200 may be configured for obstacle detection outside of the vehicle 600, as an example. Alternatively or in addition, the vehicle 600 may require a driver to control the direction of travel of the vehicle 600. The LIDAR system 200 may be a driving assistant. As an example, the LIDAR system 200 may be configured for obstacle detection, e.g. determining a distance and/or direction and relative velocity of an obstacle (target 210) outside of the vehicle 600. The LIDAR system 200 may be configured, along one or more light paths 140-$i$ (with i being one between 1 to N and N being the number of channels of the PIC), to emit light 114 from one or more outputs of the LIDAR system 200, e.g. outputs of the light paths, and to receive light 122 reflected from the target 210 in one or more light inputs of the LIDAR system 200. The structure and design of the outputs and inputs of the light paths of the LIDAR system 200 may vary depending on the working principle of the LIDAR system 200. Alternatively, the LIDAR system 200 may be or may be part of a spectrometer or microscope. However, the working principle may be the same as in a vehicle 600.

Figure 2:
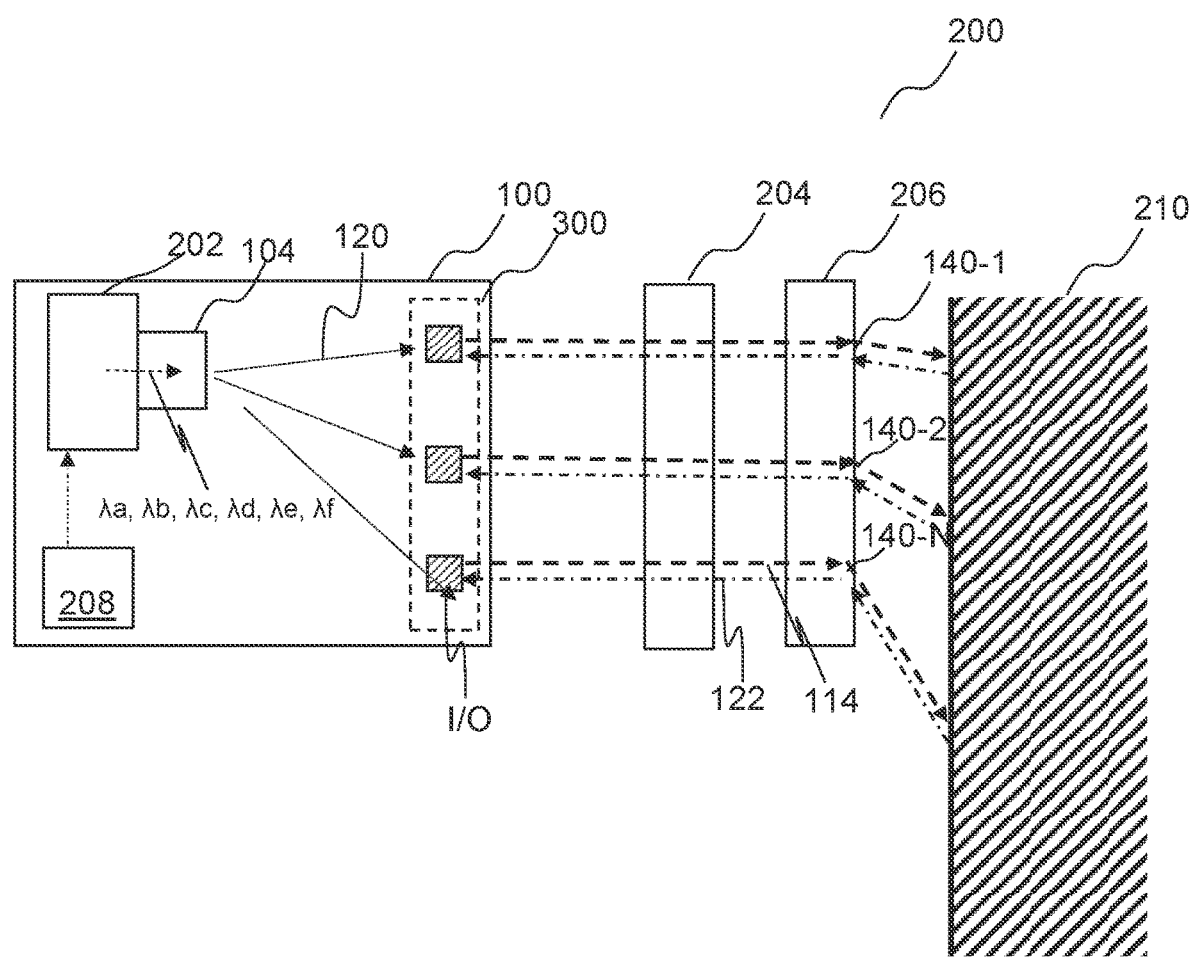
FIG. 2 and FIG. 3 show schematic illustrations of a light detection and ranging system.

FIG. 2 illustrates a schematic top view of a LIDAR system 200. The LIDAR system 200 includes a photonic integrated circuit (PIC) 100 and at least one coherent electromagnetic radiation source 202 coupled to the at least one light receiving input 104. The electromagnetic radiation source 202 may be configured to emit a coherent electromagnetic radiation $\lambda a$, $\lambda b$, $\lambda c$, $\lambda d$, $\lambda e$, $\lambda f$ of one or more wavelength. Through this specification any kind of usable of "electromagnetic radiation" is denoted as "light" for illustration purpose only and even though the electromagnetic radiation may not be in the frequency range of visible light, infrared light/radiation or ultraviolet light/radiation. As an example, the coherent electromagnetic radiation source 202 may also be denoted as coherent light source 202 or light source 202. The at least one light source 202 may be configured to provide coherent electromagnetic radiation (also denoted as coherent light) 120 to a plurality of waveguide structures, e.g. laser radiation in a visible light spectrum, an infrared spectrum, a terahertz spectrum and/or a microwave spectrum. As an example "light" may be visible light, infrared radiation, terahertz radiation or microwave radiation, and the optical components of the LIDAR system 200 may be configured accordingly.

The light source 202 may be configured to be operated as a continuous wave laser and/or a pulsed laser. The light source 202 may be configured to be operated as a continuous wave (CW) laser, e.g. for frequency modulated continuous wave (FMCW) LIDAR in which the frequency of the light input to the input 104 is sweeped or chirped, and/or a pulsed laser, e.g. for TOF LIDAR. However, the light source 202 may also be a CW laser, e.g. a CW laser diode, operated in a pulsed mode, e.g. quasi CW (QCW) laser.

The PIC 100 includes a plurality of light paths 140-$i$ each having and input port (I) configured to receive back reflected light 122 from the target 210 and an output port (O) configured to emit light 114 towards the target 210 (in the following also denoted as I/O ports). The I/O ports may be configured according to the PIC and LIDAR layout and design, e.g. according to a monostatic LIDAR having shared I/O ports per light path or a bistatic LIDAR having separated input and output ports per light path. The I/O ports may have a predetermined I/O structure 300 as described in more details below (e.g. see FIG. 4 to FIG. 6).

The one or more outputs I/O of the I/O structure 300 may be configured to emit electromagnetic radiation of the light source 202 to different parts of a target 210, e.g. at the same time or subsequently, e.g. along one or more light paths 140-$i$, as illustrated in FIG. 2. This way, light emitted by the output I/O of the PIC 100 samples different portions of the target (not the same pixel) 210 and/or different targets 210 at the same time and allows to adjust the vertical resolution. Thus, light reflected 122 from the target 210 and detected by a photo detector 112 of different light paths contains information correlated to different portions of a target (not the same pixel) and/or different targets at the same time. In other words, a plurality of light paths 140-N emit light into different directions in space.

A lens 204 and a grating 206 may be optically arranged to guide light 114 from the output of the PIC 100 to the outside of the LIDAR system 200. The grating structure 206 may be optically arranged to guide light from lens 204 to the outside of the LIDAR system 200.

The grating structure 206 may be a transmission grating, a reflective grating, or a grism.

The lens 204 may be any one of a converging lens 204, a collimating lens 204 or a diverging lens.

As an example, the lens 204 may be configured and/or may be provided such that light from the outputs I/O of the light paths 140-$i$ of the plurality of light paths 140-N have different angles of inclination on a (planar) grating structure 206. However, the function of the lens 204 and of the grating structure 206 may also be integrated in a single optical element, e.g. a lens-shaped grating. The purpose of the lens 204 and the grating 206 may be to emit parallel light 114 from the outputs I/O of the light paths 140-$i$ into different directions in space at the same time and receive and detect the light 122 back reflected from a target 210 in the photo detector 122.

In general, the grating structure 206 may be configured to guide or redirect electromagnetic radiation of a first wavelength $\lambda a$ by a first angle $\theta^a$ and a second wavelength $\lambda b$ by a second angle $\theta^b$. Thus, light may be emitted in different directions in space depending on the wavelength (frequency) of the light and the spatial position of the light path 140-*i* on the PIC 100. Light of different wavelengths may be emitted at the same time or subsequently through a light path 140-*i*, e.g. the light paths may be multiplexed in emission timing and/or wavelength. As an example, light of a second wavelength λb maybe emitted in the time period while awaiting light of a first wavelength λa to be received at the photo detector 112 or together at the same time. This, way a scanning, sensing or sampling of different parts of a target or free space at the same time may be enabled and, thus, the resolution of the LIDAR system 200 may be increased.

A scan mirror 404 may be arranged in the light path 140-*i* between the grating structure 206 and the outside of the LIDAR system 200. The scan mirror 404 may be configured to be movable, e.g. rotatable, to scan the environment of the LIDAR system 200. Alternatively, or in addition, the grating structure 206 may be configured to be movable, e.g. a movable reflection grating.

Further, a quarter wave plate (QWP) 402 or half wave plate (HWP) may be arranged in the light path between the grating structure 206 and the scan mirror 404.

The LIDAR system 200 may further include a controller 208. The controller 208 may be configured to control various electronic components, e.g. the light source, optical amplifiers, or other controllable optical components, e.g. a shutter. The controller 208 may be an application specific integrated circuit (ASIC), as an example. The controller 208 may be formed from, integrated in or mounted to the semiconductor photonic substrate 102. However, the controller 208 may also be located outside of the PIC 100.

The controller 208 may further include one or more processor and a memory having instructions stored therein that, when executed by the one or more processor may cause the processor to determine a predefined interlaced angular dispersion, wherein the interlaced angular dispersion comprises that a second light emitted by a first light path has an angular dispersion that is arranged between an angular dispersion of first light emitted through a first light path and an angular dispersion of first light emitted by a second light path; to determine one or more light source(s) to be controlled; to determine one or more light path(s) to be controlled; and to control the determined light source to emit the first light and the second light through the determined light paths such that the light detection and ranging system comprises the determined interlaced angular dispersion. Here, the first light path does not necessarily refer to light path 140-1, and the second light path does not necessarily refer to light path 140-2. The described interlaced angular dispersion may be applicable to any one of the light paths 140-*i*, and light of other wavelengths may be arranged between the angular dispersion of the first light emitted from the the first light path and the second light path.

The controller 208 may further be configured to determine a frequency difference between the frequency of emitted electromagnetic radiation 114 and received electromagnetic radiation 122. The controller 208 may further be configured to determine a time difference between the emission timing of the emitted electromagnetic radiation 114 and the detection timing of the received electromagnetic radiation 122.

Figure 3:
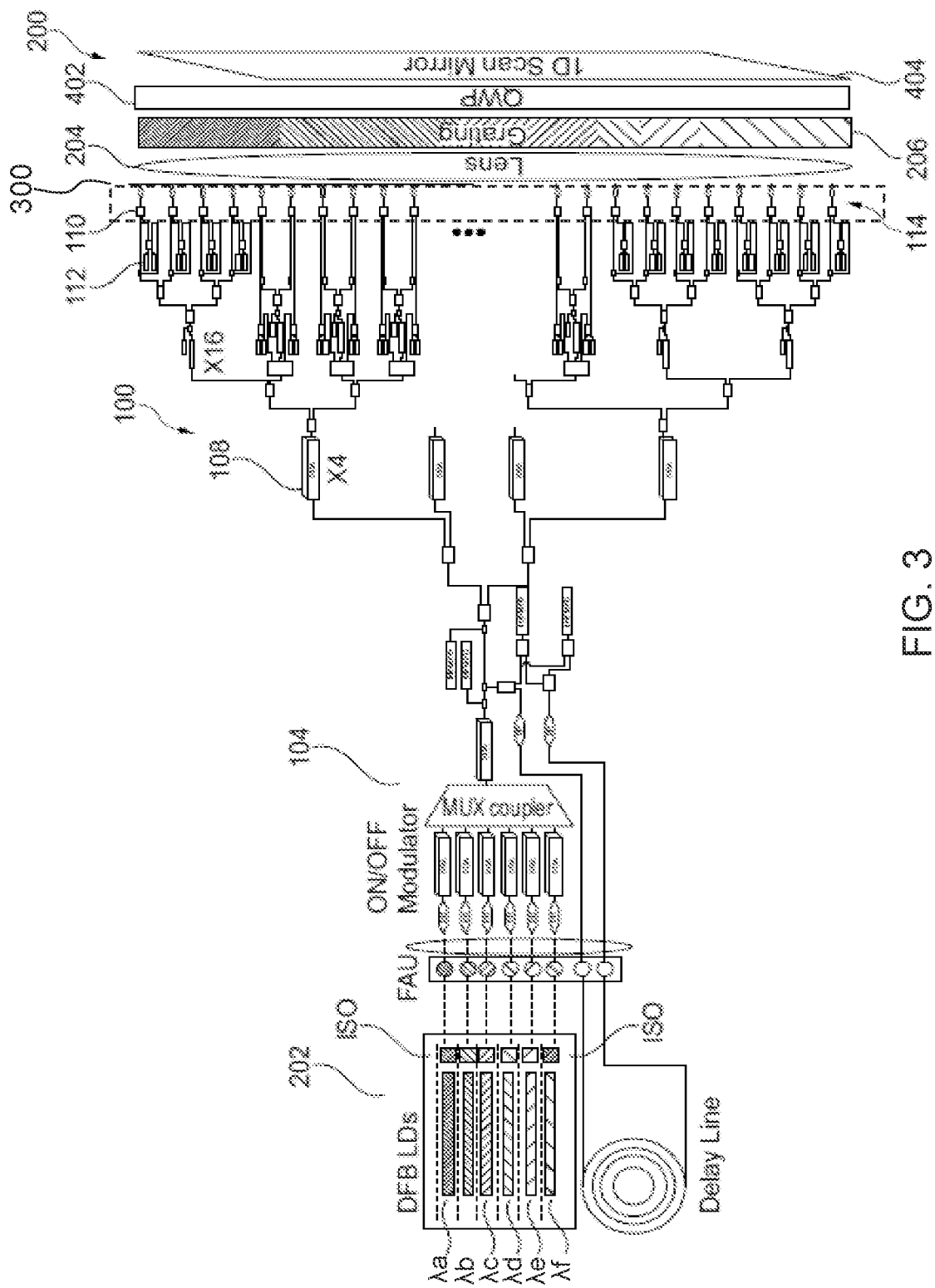

FIG. 3 illustrates a schematic top view of a monostatic LIDAR system 200 as an example.

The photonic integrated circuit 100 may include a semiconductor photonic substrate 102. The semiconductor photonic substrate 102 may have integrated therein at least one light receiving input 104 and at least one optical splitter 110 to branch light received at the at least one light receiving input 104 to a first light path 140-1 and a second light path 140-2, e.g. of the plurality of light paths 140-N (see also FIG. 2).

The semiconductor photonic substrate 102 may be made of a semiconductor material, e.g. silicon. The semiconductor photonic substrate 102 may be common substrate, e.g. at least for the plurality of light paths 140-N. The term "integrated therein" may be understood as formed from the material of the substrate and, thus, may be different to the case in which elements are formed, arranged or positioned on top of a substrate. The term "located next" may be interpreted as formed in or on the same (a common) semiconductor photonic substrate 102.

Using a multiple (M) wavelength laser source 202 (in FIG. 3 is M=6 illustrated by λa, λb, λc, λd, λe, λf) and the grating structure 206, the number of LIDAR channels may be increased by a factor of M for a given PIC 100 to achieve a desired high number (for example more than 16, e.g. more than 32) of vertical resolution elements or pixels. Hence, a high-performance coherent LIDAR system 200 is achieved. In general, using N parallel light paths 140-N and M wavelengths in a wavelength-multiplexed LIDAR system 200 results in a total of M*N angular outputs. The angular output of the M*N channels of each wavelength Δx (x=a, b, c, . . . ) and each position output I/O of the light paths 140-*i* (i=1, 2, 3, . . . N) is denoted by $\theta^x_i$ in FIG. 6. Thus, as an example, multiple (e.g. more than 10) vertical optical channels operating in parallel may be provided. Hence, the LIDAR system may have a high (>1M pixels/s) overall or effective data rate. The number of PIC channels N to increase the number of vertical resolution elements (or reduce the cost by using fewer or smaller PICs) is readily scalable. The coherent LIDAR implemented on a silicon PIC will (uniquely) enable the high performance and pricing required by customers for autonomous vehicle applications.

The wavelength λa, λb, λc, λd, λe, λf may differ by a few Å to a few nm from each other, as an example. The LIDAR system 200 may include one or more light source(s) 202 configured to emit electromagnetic radiation of different/ multiple wavelengths/frequencies. The light source 202 may be tunable via the controller 208 to emit light of different predetermined wavelengths λa, λb, λc, λd, λe, λf. Alternatively, or in addition, an optical filter, e.g. a low pass, high pass, band pass or notch filter may select a wavelength/ frequency of a plurality of wavelengths of a single light source. This way, by using wavelength multiplexing of spatially parallel optical channels in the PIC 100, the detrimental effects due to fluctuating targets and TOF limitations are mitigated, thus enabling a coherent LIDAR with high optical resolution, high data rate, and long-range detection to be achieved.

Further illustrated in FIG. 3 is the branching of light paths from the at least one input 104 to the plurality of outputs I/O. The branching of light 116 from the light source (see also FIG. 2) may be realized by a plurality of optical amplifiers 108, e.g. SOA 108, a plurality of optical splitters 110 and a plurality of waveguide structures (e.g. solid lines in FIG. 3).

The at least one optical splitter 110 may be configured to branch light received at the at least one light receiving input 104 to a plurality of light paths 140-N. In each light path 140-*i* of the plurality of light paths 140-N, the photonic integrated circuit 100 may include at least one amplifier structure 108 to amplify the light in the light path to provide an amplified light. Each light path of the plurality of light paths may include at least one light output I/O configured to output the amplified light from the photonic integrated circuit 100 towards the lens 204. Each light path 140-$i$ of the plurality of light paths 140-N may include at least one photo detector 112 configured to receive light 122 from the outside of the photonic integrated circuit 100. The at least one photo detector 112 may be located next to the at least one light output I/O, e.g. integrated in the common semiconductor photonic substrate 102.

A waveguide structure may be in the form of a strip line or micro strip line. However, a waveguide structure may also be configured as a planar waveguide. The waveguide structure may be configured to guide an electromagnetic radiation emitted from a light source 202 coupled to the input 104 to the output of the light paths 140-$i$. The waveguide structure may be formed from the material of the semiconductor photonic substrate 102. Waveguide structures may be optically isolated from each other. As an example, at least one waveguide structure may be formed from semiconductor photonic substrate 102.

Further illustrated in FIG. 3 is a use of balanced photo detector pairs as photo detectors 112 in the light paths 140-$i$ respectively. A photo detector pair 112 may reduce an impact of electronic noise on the detected signal. Further illustrated in FIG. 3 is a use of a part of the light from the optical splitter 110 as input signal for a photo detector 112 in the light paths respectively. Here, the input signal may be used as local oscillator (LO) for determining a difference between the light 114 emitted from the output I/O of the PIC 100 and light 122 received from the input I/O from the outside of the PIC 100 at the photo detector 122, e.g. in monostatic or bistatic LIDAR systems. This way, temporal fluctuations of the emitted light 114 may be considered in the received light 122 for each light path 140-$i$ individually.

The photo detector 112 of different light paths 140-$i$ may be optically isolated from each other and/or may be addressable independently from each other. In other words, the photo detectors 112 of different light paths 140-$i$ may be configured to detect light from the outside of the PIC 100 independently from each other.

Figure 4:
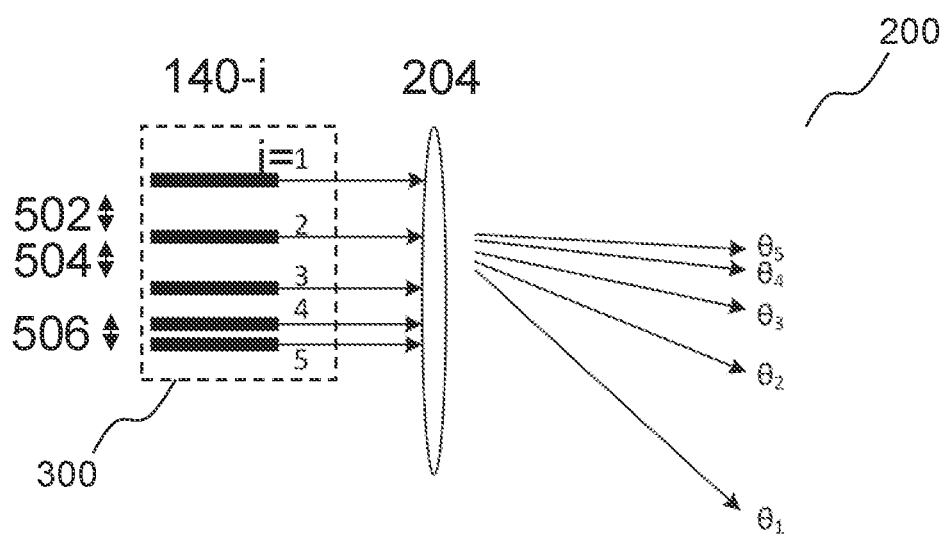
FIG. 4 to FIG. 6 show schematic illustrations of an operation of a light detection and ranging system.
Figure 5:
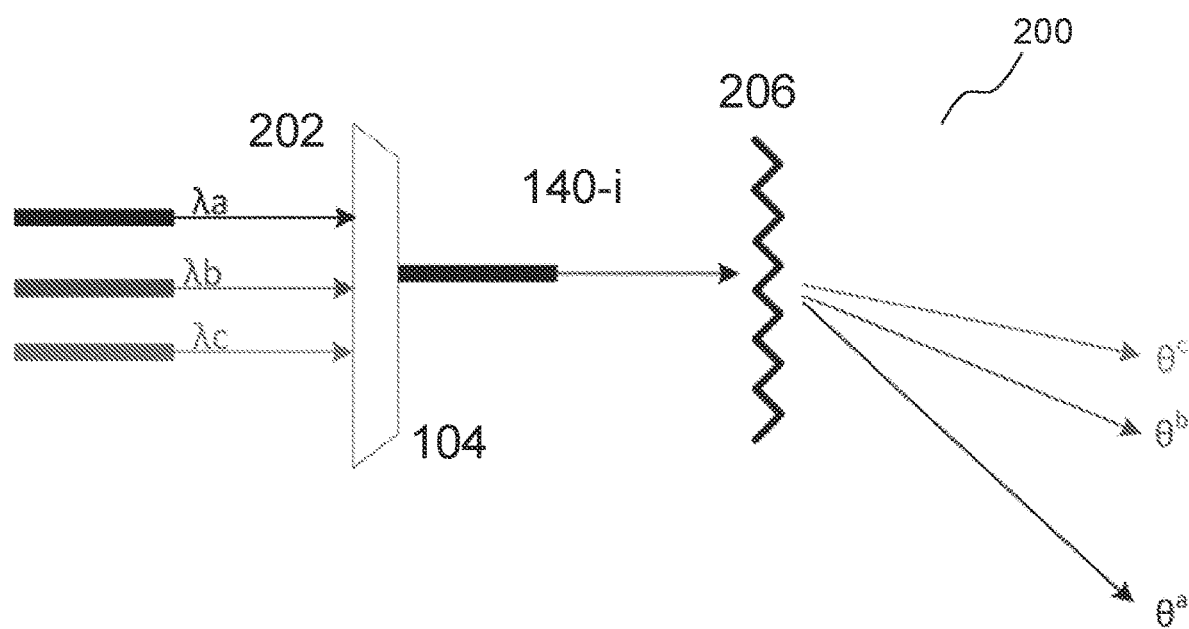
Figure 6:
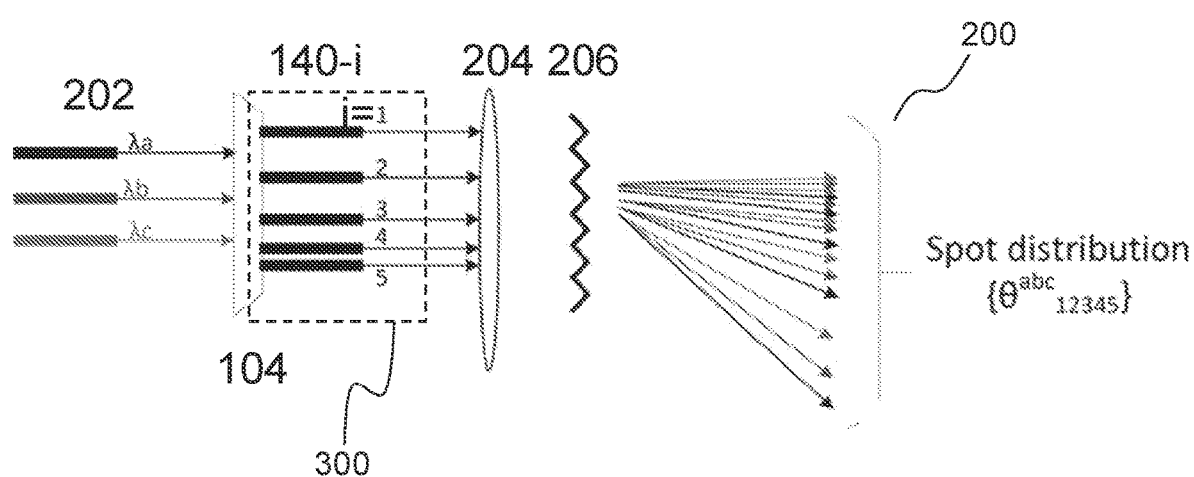

FIG. 4 to FIG. 6 illustrate schematic cross-sections of a LIDAR system 200 illustrating the effect of various I/O structures 300 (see FIG. 2 and FIG. 3) and different control modes of the light sources 202. Only the transmit channels (the emitted light 114) are shown without loss of generality.

FIG. 4 illustrates five light paths 140-1, 140-2, 140-3, 140-4, 140-5 of a plurality of light paths for a first I/O structure 300. Further illustrated is that the lens 204 converts the I/O structure 300, e.g. the spatial locations of the outputs I/O (LIDAR channels), to angular positions $\theta_1, \theta_2, \theta_3, \theta_4, \theta_5$. Further illustrated is that the I/O structure 300 allows to tailor the resolution between coarse (e.g., 61-62) and fine (e.g., 64-60 by tailoring the spatial distance 502, 506 of the outputs I/O. As an example, the outputs I/O of the PIC 100 may be configured that the next neighbor distance 502, 504 (also denoted as light path spacing) between the outputs I/O is non-homogenous (also denoted as non-uniform) for the plurality of light paths 140-N. Illustratively, a first distance 502 between the output I/O of the first light path 140-1 and the output I/O of the second light path 140-2 may be larger than a second distance 504 between the output I/O of the second light path 140-2 and the output I/O of the third light path 140-3. The next neighbor distance 502, 504, 506 may increase from one side of the PIC 100 to the other side of the PIC 100, as illustrated in FIG. 4. Thus, the next neighbor distance of the outputs of the plurality of light paths 140-N may be asymmetrical regarding an optical axis of the LIDAR system 200. Depending on the working principle of the LIDAR system 200, the next neighbor distance of the light paths 140-N may also be symmetrical to the optical axis and may increase from the optical axis to the respective distal end of the PIC 100. However, the specific arrangement of the outputs of the light paths 140-N may be specific to the application of the LIDAR system 200. As an example, the LIDAR system 200 of a vehicle 600 (see FIG. 1) may require an asymmetrical arrangement of outputs I/O in the I/O structure 300, and the LIDAR system 200 of a microscope or spectrometer may require a symmetrical arrangement of outputs I/O in the I/O structure 300.

FIG. 5 illustrates that the grating structure 206 may be configured to guide or redirect light of a first wavelength $\lambda a$ (also denoted as first light) by a first angle $\theta^a$, a second wavelength $\lambda b$ (also denoted as second light), by a second angle $\theta^b$ and a third wavelength $\lambda c$ (also denoted as third light) by a third angle $\theta^c$. A required number of angular lines (the lines or positions of the lines illustrated to the right of the lens 204) for a certain resolution of the LIDAR system 200 may require the addition of wavelength multiplexing to the parallel channels. When a light path 140-$i$ uses light of multiple wavelengths, e.g. $\lambda a$, $\lambda b$, $\lambda c$, and a diffractive element such as a grating 206, as illustrated in FIG. 5, more angular positions, e.g. $\theta^a$, $\theta^b$, $\theta^c$ are generated. The angular positions may be determined by the choice of wavelengths $\lambda a$, $\lambda b$, $\lambda c$ and the dispersion of the grating 206. Non-uniform angular resolutions may be obtained by appropriate choice of the wavelengths $\lambda a$, $\lambda b$, $\lambda c$ and tailoring the dispersion of the grating structure 206.

FIG. 6 illustrates the effect of using the principle illustrated in FIG. 4 and FIG. 5 in combination. Thus, a plurality of wavelengths $\lambda a$, $\lambda b$, $\lambda c$ and a plurality of light paths 140-N may be used to enable a high resolution with a high angular coverage denoted as $\theta^{abc}_{12345}$. Here, $\theta^{abc}_{12345}$ is an abbreviation for all possible combinations of wavelengths and light paths. In more general, $\theta^{abc}_{12345}$ may also be denoted as $\theta^x_i$ with $x\in 1$ to M, $i\in 1$ to N, and thus one of M*N possibilities. As an example $\theta^a_1$ denotes the angular distribution for first light emitted from the grating 206 through the first light path 140-1 having the first wavelength $\lambda a$, $\theta^c_3$ denotes the angular distribution for third light emitted from the grating 206 through the third light path 140-3 having the third wavelength $\lambda c$, etc.

Illustratively, the exact ordering of the angles of the angular distribution $\{\theta^x_i\}$ may be tailored to meet particular resolution requirements of the LIDAR system 200. The ordering of the angles $\{\theta^x_i\}$ may be, as an example, one of a "natural" ordering, a "reverse" ordering or an "interlaced" ordering or a combination thereof.

In the natural ordering, the angular positions due to wavelength dispersion fill in the gaps between the angular positions. As an example, this ordering may be $\{\theta^a_1, \theta^b_1, \theta^c_1, \theta^a_2, \theta^b_2, \theta^c_2, \theta^a_3, \theta^b_3, \theta^c_3, \ldots\}$. The natural ordering may require the smallest wavelength diversity and dispersion. The dispersion of the grating 206 may be different for the different light paths 140-$i$. This may be used to further tailor the angular spacings of the light paths 140-$i$ (see FIG. 4). Illustratively, the natural ordering may be a simple angular distribution ordering.

In the reverse ordering, the angular positions may be determined by locations of the light paths 140-$i$ that fill the gap between the angular positions due to the resolution of the grating 206. This ordering is $\{\theta^a_1, \theta^a_2, \theta^a_3, \theta^a_4, \theta^a_5, \theta^b_1, \theta^b_2, \theta^b_3, \theta^b_4 \theta^b_5, \theta^c_1, \theta^c_2, \theta^c_3, \theta^c_4, \theta^c_5, \ldots\}$. Reverse ordering may require the largest wavelength range and dispersion.

In the interlaced ordering, depending on the selection of wavelengths and the locations of the light paths 140-$i$ on the PIC 100, an arbitrary ordering of $\{\theta^x_i\}$ is achieved, e.g. as illustrative example: $\{\theta^a_2, \theta^b_2, \theta^a_3, \theta^c_2, \theta^a_4, \theta^b_3, \theta^a_5, \theta^b_4, \theta^c_3, \theta^b_5, \theta^c_4\}$. However, many other combinations are possible. As an example, each of the light paths 140-*i* may emit light of one or more wavelength(s) different to the wavelength(s) of the adjacent light path or any other light path. Alternatively, a first group of light paths (i.e. a subsection of the plurality of light paths) may emit light of a first set of wavelengths that is different from the set of wavelengths a second group of light paths emits. The light paths of the same group do not necessarily have to be adjacent to each other. As an example, the light paths of the first group and the light paths of the second light path may be spatially interlaced (e.g. in the ordering). Thus, the total number of angles θ may be equal or less M*N. For example, the top two paths 140-1 and 140-2 may only use the wavelengths λa and λb, and not λc, or the top two paths 140-1 and 140-2 may use a different wavelength set λp, λq, λr than the other light paths 140-3, 140-4, 140-5.

As an example, an interlaced ordering may be used below the line of the horizon and a natural ordering above the line of horizon or the interlaced ordering may be enclosed by natural ordering, e.g. $\{\theta^a_1, \theta^b_1, \theta^c_1, \theta^a_2, \theta^b_2, \theta^a_3, \theta^c_2, \theta^a_4, \theta^b_3, \theta^a_5, \theta^b_4, \theta^c_3, \theta^b_5, \theta^c_4, \theta^c_5\}$. Alternatively, or in addition, an interlaced ordering may be used in front of the half side of the vehicle 600 (see FIG. 1) where the driver is located and a reverse ordering may be used for the other half. Alternatively, or in addition, as an example in an unmanned areal vehicle (UAV), an interlaced ordering may be used in the direction of propagation and a natural ordering or a reverse ordering in other directions. Illustratively, the controller 208 may control the light sources 202 to select one of plurality of predefined angular distributions, and, hence, the angular distribution of the LIDAR system 200 may be tunable. As an example, the controller 208 may be configured such that the driver of the vehicle 600 illustrated in FIG. 1 may adjust the resolution of the LIDAR system 200, e.g. similar to switching between high beam and low beam. Alternatively, or in addition, the controller 208 may be configured such that a driving assistance of the vehicle, e.g. similar to a rain sensor, may adjust the resolution of the LIDAR system 200 automatically, e.g. in case the obstacle density in the propagation direction of the vehicle changes beyond a threshold value. As an example, urban areas require a higher resolution for the LIDAR system 200 than in the country side. The switching of the angular distribution may be initiated by an additional sensor the vehicle 600, e.g. a traffic sign sensor recognizing the street sign of a playing street.

Figure 7:
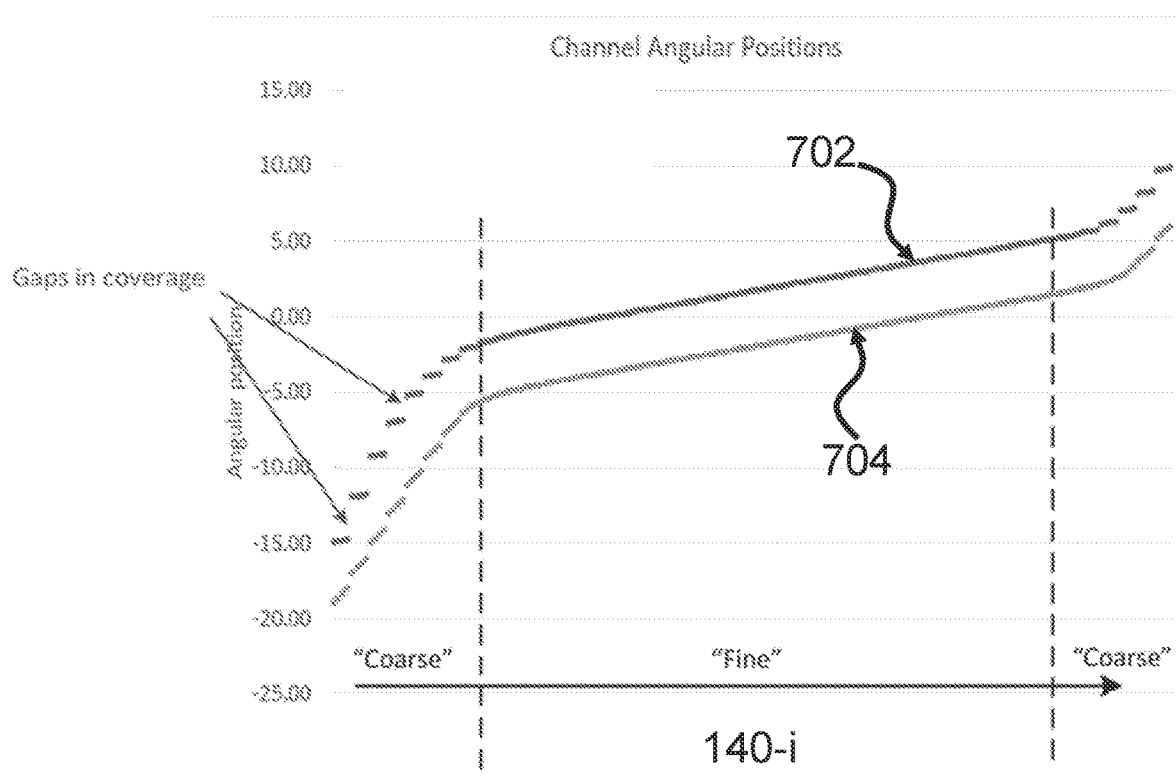
FIG. 7 shows a diagram of angular dispersions of a light detection and ranging system.

FIG. 7 shows a diagram that illustrates numerical examples for the natural ordering 702 and the interlaced ordering 704. The numbers of the examples are chosen only to illustrate the concept. Here, 4 wavelength channels, and a "fine" angular resolution requirement of 0.1 degrees are assumed. Using natural ordering 702, the spacing of outputs of light paths in the "fine" region is selected to result in an angular resolution of 0.4 degrees, and the wavelength dispersion of 4 equally spaced wavelengths to result in an angular spacing of 0.1 degrees. This set of 4 wavelengths is let to be $\{\lambda_0, \lambda0+1 \text{ unit}, \lambda0+2 \text{ units}, \lambda0+3 \text{ units}\}$, or $\{0,1,2,3\}$ in short. With the same spacing of outputs of light paths in the "fine" region of the FOV, but with a different wavelength set, e.g., {0, 5, 10, 15}, the same resolution of 0.1 deg is achieved. The difference is that the set {0, 1, 2, 3} results in an unnecessarily good resolution of 0.1 deg and gaps in coverage in the "coarse" region, while the set {0, 5, 10, 15} results in a "coarse" resolution of 0.5 deg which is more optimal.

A generalized design rule is that any set of M wavelengths {x1, x2, x3, . . . , xM} achieves the same fine resolution as the set of wavelengths {0, 1, 2, . . . M−1} if the set {x1, x2, x3, . . . , xM} (modulo M) is equal to the set {0, 1, 2, . . . M−1}

In interlaced ordering, the wavelength diversity is introduced by coupling in light from different lasers, or light from different wavelength modes of a single laser into the PIC 100, as illustrated in FIG. 5 and FIG. 6. In addition, the light paths are spaced in a non-uniform manner, as illustrated in FIG. 4 and FIG. 6

Working at or near the Littrow angle of the grating 206 achieves the maximum efficiency of the LIDAR system 200. However, this may limit the achievable amount of change in grating dispersion and, hence, the grating dispersion may be substantially constant over the field of view (FOV). Thus, wavelength dispersion induced angular positions are distributed approximately the same way over the entire FOV. The wavelength spacing, e.g. the wavelength distance between λa and λb, or between λb and λc, may thus define the fine resolution of the natural ordering. In the "fine" region of the FOV, this is (for example) $\theta^a_3$-$\theta^b_3$. However, because of grating constraints discussed above, a similarly high resolution (e.g., $\theta^a_1$-$\theta^b_1$) is obtained even in the "coarse" regions of the FOV where such good resolution is not desired. This may lead to large "gaps" in the LIDAR coverage as shown in FIG. 7 (Trace 702).

Interlaced ordering illustrated by Trace 704 in FIG. 7 provides a better coverage of the FOV in the fine and coarse regions due to the optimization of the positions of the outputs of light paths and the wavelength spacings.

For one or more examples, at least one of the components set forth in one or more of the preceding figures may be configured to perform one or more operations, techniques, processes, and/or methods as set forth in the example section below.

EXAMPLES

The examples set forth herein are illustrative and not exhaustive.

Example 1 is a photonic integrated circuit (PIC) including a semiconductor photonic substrate having integrated therein a plurality of light paths each configured to emit at least a first light having a first wavelength and a second light having a second wavelength from a coherent light source to the outside of the PIC through an output of the light path, the outputs of the light paths arranged next to each other, wherein outputs of adjacent light paths of at least a subset of the plurality of light paths have a non-uniform distance with a neighboring light path on the semiconductor substrate. As an example, a PIC may include a semiconductor photonic substrate having integrated therein a plurality of light paths each having an input coupled to an output through a waveguide structure, wherein each light path may be configured to guide at least a first light having a first wavelength and a second light having a second wavelength from the input through the waveguide structure to the output and to emit the first light and second light from the output to the outside of the photonic integrated circuit. The inputs of the light paths may be configured to be coupled to at least one coherent light source configured to provide at least the first light and the second light. The outputs of the light paths may be arranged next to each other and wherein directly adjacent outputs of adjacent light paths may be arranged in a next neighbor distance on the semiconductor substrate, wherein the next neighbor distance may be non-uniform for at least a subset of the plurality of light paths.

In Example 2, the subject matter of Example 1 can optionally include that a second output is arranged in a first distance lateral next to a first output, and a third output is arranged in a second distance lateral next to the first output, wherein the first output is arranged between the second output and the third output and the second distance is larger than the first distance. As an example, the outputs of at least a subset of the plurality of light paths may be arranged such that a second output may be arranged in a first distance lateral next to a first output, and a third output may be arranged in a second distance lateral next to the first output, wherein the first output may be arranged between the second output and the third output and the second distance may be larger than the first distance.

In Example 3, the subject matter of Example 1 or 2 can optionally include that the plurality of light paths are arranged in parallel next to each other.

In Example 4, the subject matter of any one of Example 1 to 3 can optionally include that the non-uniform distance increases from one side of the PIC to an opposite side of the PIC.

In Example 5, the subject matter of any one of Example 1 to 3 can optionally include that the plurality of light paths includes an optical axis, wherein the outputs of the light paths are arranged symmetrically regarding the optical axis. As an example, the optical axis may be an optical center axis.

In Example 6, the subject matter of any one of Example 1 to 3 can optionally include that the plurality of light paths includes an optical axis, wherein the outputs of the light paths are arranged non-uniform regarding the optical axis.

In Example 7, the subject matter of any one of Example 1 to 6 can optionally include that each of the plurality of light paths including a photo detector structure configured to detect an interference signal based on light emitted from the light paths and back reflected from the outside. As an example, each light path further may include a photo detector structure configured to detect an interference signal based on the first light and second light emitted from the output of the light path to the outside of the photonic integrated circuit, and on the first light and second light back reflected from the outside of the photonic integrated circuit and received at another input of the light path.

In Example 8, the subject matter of any one of Example 1 to 7 can optionally include that the semiconductor photonic substrate is made of a semiconductor material.

In Example 9, the subject matter of any one of Example 1 to 8 can optionally further include a controller configured to control the light emitted through the light paths of the plurality of light paths.

Example 10 is a light detection and ranging (LIDAR) system, including a PIC of one of the examples 1 to 9 The LIDAR system further including at least one coherent light source configured to provide at least the first light and the second light; a lens and a grating structure optically coupled with the outputs of the plurality of light paths wherein the outputs emit light through the lens and via the grating to the outside of the LIDAR system; and a controller configured to control the light emitted through the light paths of the plurality of light paths.

In Example 11, the subject matter of Example 10 can optionally further include at least a subset of the plurality of light paths is configured to guide a plurality of lights, each light having a plurality of wavelengths, wherein the first light and the second light are a subsection of the plurality of lights.

In Example 12, the subject matter of Example 10 or 11 can further optionally include a movable scan mirror to guide light to different directions in the outside of the LIDAR system.

In Example 12, the subject matter of any one of Examples 10 to 12 can optionally include that the LIDAR system is configured as one of a monostatic LIDAR system, bistatic LIDAR system or time-of-flight LIDAR system.

In Example 13, the subject matter of any one of Example 10 to 12 can optionally include that the controller further including one or more processor and a memory having instructions stored therein that, when executed by the one or more processor cause the processor to: determine a predefined interlaced angular dispersion including the usage of at least: three light paths directly adjacent to each other and two lights having different wavelengths emitted by the three light paths, or two light paths directly adjacent to each other and three lights having different wavelengths emitted by the two light paths; wherein at least one light of one light path has an angular dispersion arranged between the angular dispersions of another light emitted through directly adjacent light paths; determine one or more light source(s) to be controlled; determine one or more light path(s) to be controlled; control the determined light source to emit the determined lights through the determined light paths such that the LIDAR system includes the predefined interlaced angular dispersion.

Example 14 is a computer readable medium including instructions that, when executed by a controller of a LIDAR system cause the controller to: determine a predefined interlaced angular dispersion of a LIDAR system including the usage of at least: three light paths directly adjacent to each other and two lights having different wavelengths emitted by the three light paths, or two light paths directly adjacent to each other and three lights having different wavelengths emitted by the two light paths; wherein at least one light of one light path has an angular dispersion arranged between the angular dispersions of another light emitted through directly adjacent light paths; determine one or more light source(s) to be controlled; determine one or more light path(s) to be controlled; control the determined light source to emit the determined lights through the determined light paths such that the LIDAR system includes the predefined interlaced angular dispersion.

Example 15 is a vehicle including a LIDAR system of any one of examples 10 to

In Example 16, the subject matter of Example 15 can optionally include that the LIDAR system is configured for obstacle detection outside of the vehicle.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects. Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed.

Modifications and variations are possible in light of the above teachings or may be acquired from practice of various aspects.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus comprising a photonic integrated circuit, the apparatus comprising:
    a semiconductor photonic substrate having integrated therein a plurality of light paths each configured to emit at least a first light having a first wavelength and a second light having a second wavelength from a coherent light source to outside of the photonic integrated circuit through an output of the light path,
    the outputs of the light paths arranged next to each other, wherein outputs of adjacent light paths of at least a subset of the plurality of light paths have a non-uniform distance with a neighboring light path on the semiconductor photonic substrate,
    wherein each of the plurality of light paths comprises a photo detector structure configured to detect an interference signal based on light emitted from the light paths and back reflected from outside of the photonic integrated circuit.

2. The photonic integrated circuit according to claim 1, wherein a second output is arranged in a first distance lateral next to a first output, and a third output is arranged in a second distance lateral next to the first output, wherein the first output is arranged between the second output and the third output and the second distance is larger than the first distance.

3. The photonic integrated circuit according to claim 1, wherein the plurality of light paths are arranged in parallel to each other.

4. The photonic integrated circuit according to claim 1, wherein the non-uniform distance increases from one side of the photonic integrated circuit to an opposite side of the photonic integrated circuit.

5. The photonic integrated circuit according to claim 1, wherein the plurality of light paths comprises an optical axis, wherein the outputs of the light paths are arranged symmetrically regarding the optical axis.

6. The photonic integrated circuit according to claim 1, wherein the plurality of light paths comprises an optical axis, wherein the outputs of the light paths are arranged non-uniform regarding the optical axis.

7. The photonic integrated circuit according to claim 1, wherein the semiconductor photonic substrate is made of a semiconductor material.

8. The photonic integrated circuit according to claim 1, further comprising:
    a controller configured to control the light emitted through the light paths of the plurality of light paths.

9. A light detection and ranging system, comprising:
    a photonic integrated circuit, comprising:
        a semiconductor photonic substrate having integrated therein a plurality of light paths each configured:
            to emit at least a first light having a first wavelength and a second light having a second wavelength from a coherent light source to outside of the photonic integrated circuit through an output of the light path; and
        the outputs of the light paths arranged next to each other, wherein outputs of adjacent light paths of at least a subset of the plurality of light paths have a non-uniform distance with a neighboring light path on the semiconductor photonic substrate;
    the light detection and ranging system further comprising:
        at least one coherent light source configured to provide at least the first light and the second light;
        a lens and a grating structure optically coupled with the outputs of the plurality of light paths from which light emits through the lens and via the grating to outside of the light detection and ranging system; and
        a controller configured to control the light emitted through the light paths of the plurality of light paths,
    wherein each of the plurality of light paths comprises a photo detector structure configured to detect an interference signal based on light emitted from the light paths and back reflected from outside of the photonic integrated circuit.

10. The light detection and ranging system according to claim 9, wherein at least a subset of the plurality of light paths is configured to guide a plurality of lights, each light having a plurality of wavelengths, wherein the first light and the second light are a subsection of the plurality of lights.

11. The light detection and ranging system according to claim 9, wherein the outputs of at least a subset of the plurality of light paths are arranged, wherein a second output is arranged in a first distance lateral next to a first output, and a third output is arranged in a second distance lateral next to the first output, wherein the first output is arranged between the second output and the third output and the second distance is larger than the first distance.

12. The light detection and ranging system according to claim 9, wherein the plurality of light paths are arranged in parallel next to each other.

13. The light detection and ranging system according to claim 9, wherein the non-uniform distance increases from one side of the photonic integrated circuit to an opposite side of the photonic integrated circuit.

14. The light detection and ranging system according to claim 9, wherein the plurality of light paths comprises an optical axis, wherein the outputs of the light paths are arranged symmetrically regarding the optical axis.

15. The light detection and ranging system according to claim 9, wherein the plurality of light paths comprises an optical axis, wherein the outputs of the light paths are arranged non-uniform regarding the optical axis.

16. The light detection and ranging system according to claim 9, further comprising:
    a movable scan mirror to guide light to different directions outside of the light detection and ranging system.

17. The light detection and ranging system according to claim 9, configured as one of a monostatic light detection and ranging system, bistatic light detection and ranging system or time-of-flight light detection and ranging system.

18. The light detection and ranging system according to claim 9, the controller further comprising one or more processor and a memory having instructions stored therein that, when executed by the one or more processor cause the processor to:
    determine a predefined interlaced angular dispersion comprising the usage of at least:

three light paths directly adjacent to each other and two
   lights having different wavelengths emitted by the
   three light paths, or
two light paths directly adjacent to each other and three
   lights having different wavelengths emitted by the
   two light paths;
wherein at least one light of one light path has an
   angular dispersion arranged between the angular
   dispersions of another light emitted through directly
   adjacent light paths;
determine at least one light source to be controlled;
determine at least one light path to be controlled;
control the at least one light source to emit the two lights
   or the three lights through the at least one light path
   wherein the light detection and ranging system comprises the predefined interlaced angular dispersion.

19. A non-transitory computer readable medium comprising instructions that, when executed by a controller of a light detection and ranging system cause the controller to:
determine a predefined interlaced angular dispersion of a light detection and ranging system comprising the usage of at least:
   three light paths directly adjacent to each other and two
      lights having different wavelengths emitted by the
      three light paths, or
   two light paths directly adjacent to each other and three
      lights having different wavelengths emitted by the
      two light paths;
   wherein at least one light of one light path has an
      angular dispersion arranged between the angular
      dispersions of another light emitted through directly
      adjacent light paths;
determine one or more light source(s) to be controlled;
determine one or more light path(s) to be controlled;
control the one or more light source(s) to emit the two
   lights or the three lights through the one or more light
   path(s) such that the light detection and ranging system
   comprises the predefined interlaced angular dispersion.

20. A vehicle comprising:
a light detection and ranging system;
a photonic integrated circuit, comprising:
   a semiconductor photonic substrate having integrated
      therein a plurality of light paths each configured:
      to emit at least a first light having a first wavelength
         and a second light having a second wavelength
         from a coherent light source to outside of the
         photonic integrated circuit through an output of
         the light path; and
      the outputs of the light paths arranged next to each
         other, wherein outputs of adjacent light paths of at
         least a subset of the plurality of light paths have a
         non-uniform distance with a neighboring light
         path on the semiconductor photonic substrate;
the light detection and ranging system further comprising:
   at least one coherent light source configured to
      provide at least the first light and the second light;
   a lens and a grating structure optically coupled with
      the outputs of the plurality of light paths such from
      which light emits through the lens and via the
      grating to outside of the light detection and ranging system; and
   a controller configured to control the light emitted
      through the light paths of the plurality of light
      paths,
   wherein each of the plurality of light paths comprises
      a photo detector structure configured to detect an
      interference signal based on light emitted from the
      light paths and back reflected from outside of the
      photonic integrated circuit.

21. The vehicle of claim 20, wherein the light detection and ranging system is configured for obstacle detection outside of the vehicle.

* * * * *